(12) United States Patent
Yang

(10) Patent No.: US 7,865,771 B2
(45) Date of Patent: Jan. 4, 2011

(54) COMMAND PROCESSING DEVICES, COMMAND PROCESSING SYSTEMS, AND METHODS OF PROCESSING A COMMAND

(75) Inventor: Su-Hyun Yang, Yongin-si (KR)

(73) Assignee: Samsung Electronic Co., Ltd., Gyeonggi-Do (KR)

(*) Notice: Subject to any disclaimer, the term of this patent is extended or adjusted under 35 U.S.C. 154(b) by 760 days.

(21) Appl. No.: 11/812,883

(22) Filed: Jun. 22, 2007

(65) Prior Publication Data

US 2008/0016411 A1    Jan. 17, 2008

(30) Foreign Application Priority Data

Jul. 11, 2006    (KR) ............... 10-2006-0064813

(51) Int. Cl.
*G06F 11/00*    (2006.01)
(52) U.S. Cl. .................. 714/17; 714/23; 714/57
(58) Field of Classification Search ............ 714/10, 714/17, 23, 49, 57
See application file for complete search history.

(56) References Cited

U.S. PATENT DOCUMENTS

| | | | | |
|---|---|---|---|---|
| 5,784,618 | A * | 7/1998 | Toutonghi | 718/107 |
| 5,884,022 | A * | 3/1999 | Callsen et al. | 714/22 |
| 6,330,690 | B1 * | 12/2001 | Nouri et al. | 714/23 |
| 6,618,634 | B1 * | 9/2003 | Hwang | 700/79 |
| 6,820,000 | B2 * | 11/2004 | Miyano et al. | 701/114 |
| 6,948,103 | B2 * | 9/2005 | Indo | 714/51 |
| 7,047,321 | B1 * | 5/2006 | Endo | 710/6 |
| 7,451,447 | B1 * | 11/2008 | Deshpande | 718/102 |
| 7,698,594 | B2 * | 4/2010 | Aizawa | 714/10 |

FOREIGN PATENT DOCUMENTS

| | | |
|---|---|---|
| JP | 04-054746 | 2/1992 |
| JP | 05-089036 | 4/1993 |
| JP | 06-051910 | 2/1994 |
| JP | 06-214895 | 8/1994 |
| KR | 2001-309 | 1/2001 |

OTHER PUBLICATIONS

Korean Office Action (dated Sep. 13, 2007) for counterpart Korean Patent Application No. 2006-64813 is provided for the purposes of certification under 37 C.F.R. §§ 1.97(e) and 1.704(d).

* cited by examiner

*Primary Examiner*—Joshua A Lohn
(74) *Attorney, Agent, or Firm*—Harness, Dickey & Pierce, P.L.C.

(57) ABSTRACT

A client device includes a command processing device. The command processing device is configured to transmit an error signal while in an abnormal operation mode to prevent an error due to no response to a command received from an external source and process the command while in a normal operation mode. The error signal is indicative of the abnormal operation mode.

17 Claims, 5 Drawing Sheets

COMMAND PROCESSING DEVICES, COMMAND PROCESSING SYSTEMS, AND METHODS OF PROCESSING A COMMAND

PRIORITY STATEMENT

This non-provisional patent application claims priority under 35 U.S.C. §119 to Korean Patent Application No. 2006-64813, filed on Jul. 11, 2006 in the Korean Intellectual Property Office (KIPO), the entire contents of which is incorporated herein by reference.

BACKGROUND

Description of the Related Art

Conventionally, a computer system adopts a multi-processor system to process larger amounts of data more quickly. The multi-processor system may include a single main processor for managing the entire system and a sub-processor for processing a particular task allocated by the main processor. For example, the main processor may act as a master or server, and the sub-processor may act as a slave or client.

FIG. 1 is a diagram describing a conventional computer system communicating data between a master processor and a slave processor. FIG. 2 is a diagram describing a conventional computer system abnormally communicating data between the master processor and the slave processor.

Referring to FIGS. 1 and 2, the conventional computer system 100 may include a master processor 100 for managing the entire computer system 100 and a slave processor 120 for processing a particular task allocated by the master processor 110.

Referring to FIG. 1, the master processor 110 may transmit a specific command to the slave processor 120 and wait for a response from the slave processor 120. The slave processor 120 may process the specific command transmitted from the master processor 110, and transmit the processed results to the master processor 110. The master processor 110 may perform the next job based on the processed results from the slave processor 120.

Referring to FIG. 2, the master processor 110 may transmit a specific command to the slave processor 120 and wait for a response from the slave processor 120. If the slave processor 120 operates abnormally, the specific command may not be processed by the slave processor 120. For example, when an operation mode of the slave processor 120 corresponds to a reset mode, the slave processor 120 may not process the specific command. The master processor 110 may continue to wait for a response from the slave processor 120, and in some cases, operation of the computer system 100 may be halted.

In one example, a computer system exchanging data between a master processor and a slave processor may continue to wait for a response from the slave processor if the slave processor does not respond to a request from the master processor, and operation of the entire computer system may be halted.

SUMMARY

Example embodiments relate to command processors, for example, a command processing devices, command processing systems and methods of processing commands.

Example embodiments provide command processing devices, command processing systems and methods of processing commands capable of more adequately processing a received command in an abnormal state.

According to at least one example embodiment, a command processing device may include a command processing circuit and a command switching circuit. The command processing circuit may process a command in a normal operation mode. The command switching circuit may transmit an error signal while an abnormal operation mode is maintained so that the command processing device suppresses and/or prevents an error due to no response to a command when the command is received from an external source. The error signal may be indicative of an abnormal operation mode. The command switching circuit may transmit the command to the command processing circuit while maintaining a normal operation mode. For example, the abnormal operation mode and the normal operation mode may be determined based on a signal received from an external source.

At least one other example embodiment provides a command processing system. In an example embodiment of a command processing system, a server may be configured to transmit a reset mode signal, and a client may be configured to transmit an error signal while maintaining the transmitted reset mode signal at a first logic level so that the client suppresses and/or prevents an error due to no response to a command when the command is received from an external source. The error signal may be indicative of a reset mode. The client may process the command while maintaining the transmitted reset mode signal at a second logic level.

According to at least some example embodiments, the client may store a flag signal when the command is received at the first logic level of the reset mode signal and may generate an interrupt signal based on the flag signal when the reset mode signal transitions from the first logic level to the second logic level. The client may include a command processing circuit, a command switching circuit and an interrupt signal generating circuit. The command processing circuit may process the command while maintaining the transmitted reset mode signal at the second logic level. The command switching circuit may transmit the error signal to the external source at the first logic level of the reset mode signal and the command to the command processing circuit at the second logic level of the reset mode signal. The interrupt signal generating circuit may store the flag signal when the command is received at the first logic level of the reset mode signal and may generate an interrupt signal based on the flag signal when the reset mode signal transitions from the first logic level to the second logic level.

At least one other example embodiment provides a client device including a command processing device. The command processing device may be configured to transmit an error signal while in an abnormal operation mode to prevent an error due to no response to a command received from an external source. The error signal may be indicative of the abnormal operation mode, and the command processing device may be further configured to process the command while in a normal operation mode.

At least one other example embodiment provides a command processing system including a server and a client device. The server may transmit a reset mode signal to the client device. The client device may include a command processing device. The command processing device may be configured to transmit an error signal while in an abnormal operation mode to prevent an error due to no response to a command received from an external source. The error signal may be indicative of the abnormal operation mode, and the command processing device may be further configured to process the command while in a normal operation mode. The abnormal operation mode may be a reset mode, and the command processing device may transmit the error signal while a transmitted reset mode signal is maintained at a first logic level to prevent the error when the command is received from the external source, and process the command while the transmitted reset mode signal is maintained at a second logic level.

According to at least some example embodiments, the command processing device may further include an interrupt signal generating circuit. The interrupt signal generating circuit may store a flag signal when the command is received in the abnormal operation mode and generate an interrupt signal based on the flag signal when the abnormal operation mode changes to the normal operation mode. The command switching circuit may include a multiplexer configured to select the error signal when the command is received in the abnormal operation mode and select the command when the command is received in the normal operation mode. The command switching circuit may also include switch configured to transmit the selected error signal to the external source in the abnormal operation mode and the received command to the command processing circuit in the normal operation mode.

According to at least some example embodiments, the interrupt signal generating circuit may initialize the flag signal after transmitting the interrupt signal. In an example embodiment of an interrupt signal generating circuit, a first register may store the flag signal when the command is received in the abnormal operation mode. A second register may receive the stored flag signal when the abnormal operation mode changes to the normal operation mode and output the received flag signal. A third register may delay the output flag signal to generate a delayed flag signal. The interrupt signal generating circuit may perform a logical AND operation on the flag signal output from the second register and an inverted flag signal to generate the interrupt signal. The inverted flag signal may be generated by inverting the delayed flag signal. The interrupt signal generating circuit may initialize the first register based on the interrupt signal.

At least one other example embodiment provides a method of processing a command. In an example embodiment of a method of processing a command, an error signal may be transmitted while maintaining an abnormal operation mode to suppress and/or prevent an error due to no response to a command when the command is received from an external source. The error signal may be indicative of an abnormal operation mode. The command may be transmitted to the command processing circuit while maintaining a normal operation mode. A flag signal may be stored when the command is received in the abnormal operation mode, and an interrupt signal may be generated based on the flag signal when the abnormal operation mode changes to the normal operation mode. The flag signal may be initialized after transmitting the interrupt signal.

In another example embodiment of a method of processing a command, a reset mode signal may be transmitted and an error signal may be transmitted while maintaining the transmitted reset mode signal at a first logic level to suppress and/or prevent an error due to no response to a command when the command is received from an external source. The error signal may be indicative of a reset mode. The command may be processed while maintaining the transmitted reset mode signal at a second logic level.

In at least one other example embodiment of a method of processing a command an error signal may be transmitted while an abnormal operation mode is maintained, to prevent an error due to no response to a command when the command is received from an external source. The error signal may be indicative of an abnormal operation mode.

According to at least some example embodiments, a flag signal may be stored when the command is received at the first logic level of the reset mode signal, and an interrupt signal may be generated based on the flag signal when the reset mode signal transitions from the first logic level to the second logic level. The flag signal may be initialized after transmitting the interrupt signal.

Example embodiments may be used to design a more robust system that more adequately processes a received command in an abnormal state. Example embodiments may be used to process tasks in accordance with an interrupt signal when a state of a command processing device changes from an abnormal state to a normal state.

BRIEF DESCRIPTION OF THE DRAWINGS

Example embodiments will become more apparent by describing in detail the example embodiments shown in the drawings in which.

DETAILED DESCRIPTION OF EXAMPLE EMBODIMENTS

Figure 1:
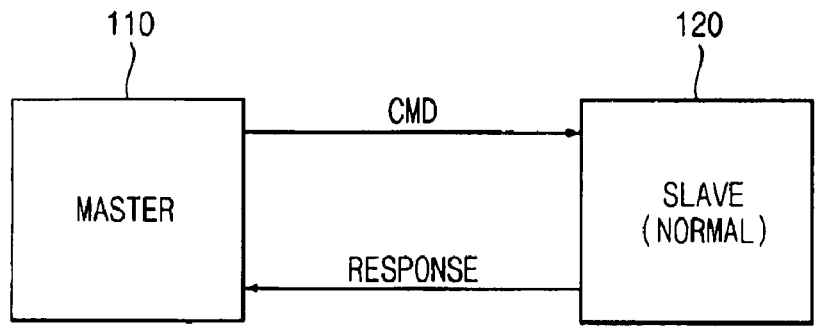
FIG. 1 is a diagram for describing a conventional computer system communicating data between a master processor and a slave processor.
Figure 2:
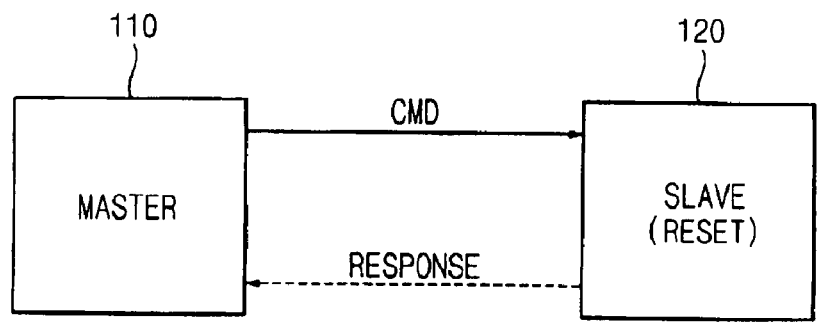
FIG. 2 is a diagram for describing a conventional computer system abnormally communicating data between the master processor and the slave processor.

Embodiments of the present invention now will be described more fully with reference to the accompanying drawings, in which embodiments of the invention are shown. The present invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout this application.

It will be understood that, although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 3:
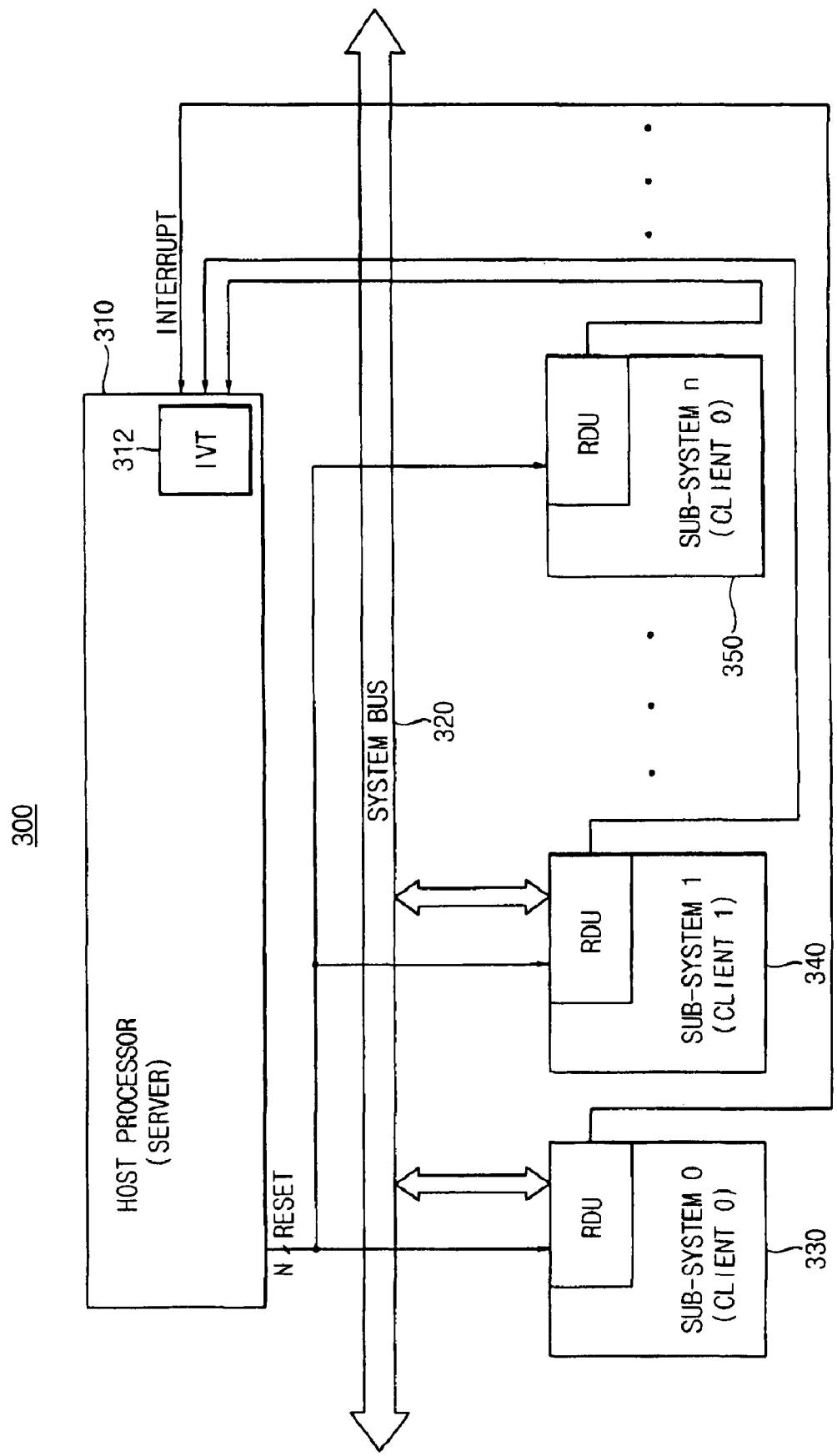
FIG. 3 is a block diagram illustrating a command processing system according to an example embodiment.

FIG. 3 is a block diagram illustrating a command processing system according to an example embodiment.

Referring to FIG. 3, a command processing system 300 may include a host processor 310, a system bus 320, and a plurality of sub-systems 330-350. The plurality of sub-systems 330-350 may also be referred to as clients, client devices or command processing devices. The plurality of sub-systems may include a first sub-system 330, a second sub-system 340 and/or a third sub-system 350. Although three sub-systems are illustrated in FIG. 3, example embodiments may include any number of sub-systems.

The host processor 310 may act as a server, and may manage the system (e.g., entire system). The host processor 310 may perform (e.g., directly perform) tasks or divide the tasks into sub-tasks, which may be distributed to the first, second and/or third sub-systems 330, 340 and/or 350. For example, the host processor 310 may transmit a specific command for performing the sub-tasks to the first, second and/or third sub-systems 330, 340 and/or 350.

The system bus 320 may be a channel for transmitting data including the specific command between the host processor 310 and each of the first, second and/or third sub-systems 330, 340 and/or 350.

Each of the first, second and third sub-systems 330, 340 and 350 may act as a client, client device or command processing device, and may execute the specific command received from the host processor or other sub-systems. Each of the first, second and third sub-systems 330, 340 and 350 may execute the received command and return the execution results to the host processor 310 and the other sub-systems.

Still referring to FIG. 3, in one example operation, the host processor 310 may transmit a particular command to the first sub-system 330 and wait for a response from the first sub-system 330. The first sub-system 330 may process the particular command received from the host processor 310 and return the processing results to the host processor 310. The host processor 310 may continue operations based on the returned results.

In another example operation, the host processor 310 may transmit a particular command to the first sub-system 330 and wait for a response from the first sub-system 330. The first sub-system 330 may not perform the particular command received from the host processor 310 when the first sub-system 330 operates abnormally. For example, the first sub-system 330 may not perform the particular command when the first sub-system 330 is in an abnormal operation mode (e.g., reset mode).

When the first sub-system 330 receives the particular command in an abnormal operation mode (e.g., reset mode), the first sub-system 330 may transmit an error signal indicative of an abnormal operation mode so that the command processing system 300 may suppress and/or prevent an error due to no response to the particular command, and the particular command may be received from the host processor 310 and other sub-systems.

Figure 4:
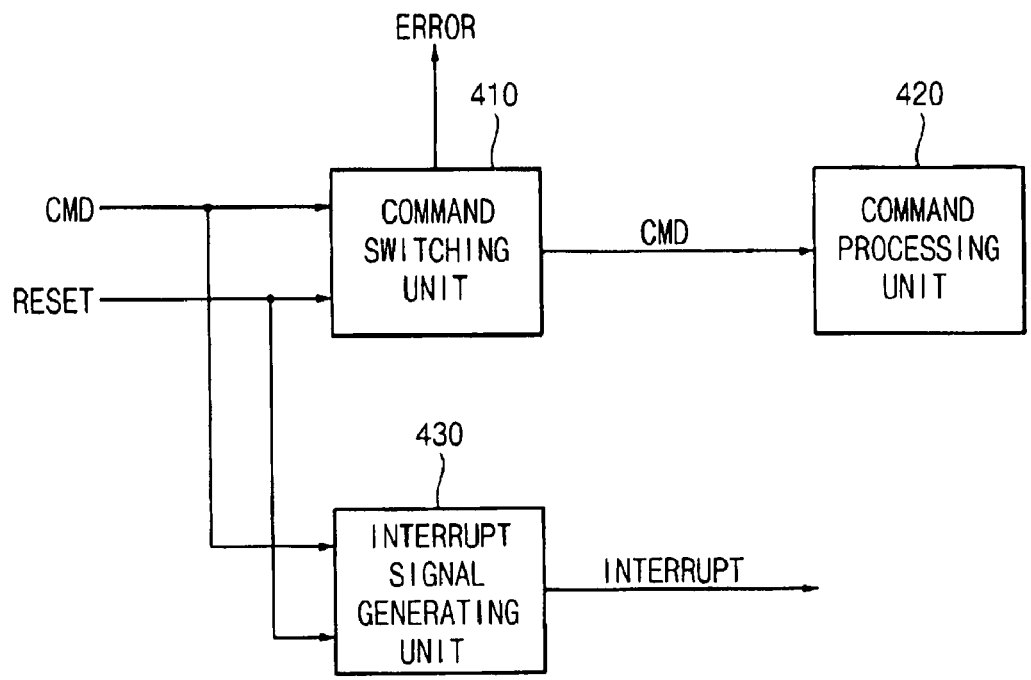
FIG. 4 is a block diagram illustrating an example of a sub-system according to an example embodiment.

FIG. 4 is a block diagram illustrating a sub-system according to an example embodiment. The sub-system of FIG. 4 is an example of the first sub-system shown in FIG. 3. Each of the second and third sub-systems 340 and 350 may be the same or substantially the same as the first sub-system 330, and thus, details of the second and third sub-systems 340 and 350 are omitted for the sake of brevity. Hereinafter, the first sub-system 330 is referred to as the sub-system 330.

Referring to FIG. 4, the sub-system 330 may include a command switching unit or circuit 410 and a command processing unit or circuit 420. The sub-system 330 may further include an interrupt signal generating unit or circuit 430.

The command switching circuit 410 may transmit an error signal indicative of an abnormal operation mode while maintaining the abnormal operation mode so that the command processing system 300 may suppress and/or prevent an error due to no response to a command when the command is received from an external source (e.g., the host processor 330 or other sub-systems). The command switching circuit 410 may transmit the command to the command processing circuit 420 while maintaining a normal operation mode.

The command processing circuit 420 may receive the command from the command switching circuit 410 and may execute the received command. The command processing circuit 420 may transmit the execution results to the host processor 310.

The interrupt signal generating circuit 430 may store a flag signal when the command is received from the external source (e.g., the host processor 330 or other sub-systems) in the abnormal operation mode and may generate an interrupt signal based on the flag signal when the abnormal operation mode is changed to the normal operation mode.

The interrupt signal may be transmitted to the host processor 310. The host processor 310 may store the interrupt signal and process the interrupt signal with reference to an interrupt vector table 312.

The command switching circuit 410 may receive a command CMD from the host processor 310 or other sub-systems. The command switching circuit 410 may transmit an error signal to the host processor 410 and/or the other sub-systems, or transmit the received command CMD to the command processing circuit 420, based on a reset mode signal RESET.

The reset mode signal RESET may indicate an operation mode of the sub-system 330. For example, when the reset mode signal RESET corresponds to a first logic level (e.g., a logic high), the sub-system 330 may operate abnormally, and when the reset mode signal RESET corresponds to a second logic level (e.g., a logic low), the sub-system 330 may operate normally.

The interrupt signal generating circuit 430 may receive the command CMD from the host processor 310 or other sub-systems. The interrupt signal generating circuit 430 may store a flag signal indicative of receiving the command CMD based on the reset mode signal RESET. The interrupt signal generating circuit 430 may transmit an interrupt signal to the host processor 310 based on the flag signal when the reset mode signal RESET is changed from a first logic level to a second logic level.

The host processor 310 may store an interrupt signal received from the interrupt signal generating circuit 430 and may process the interrupt signal with reference to an interrupt vector table 312.

Figure 5:
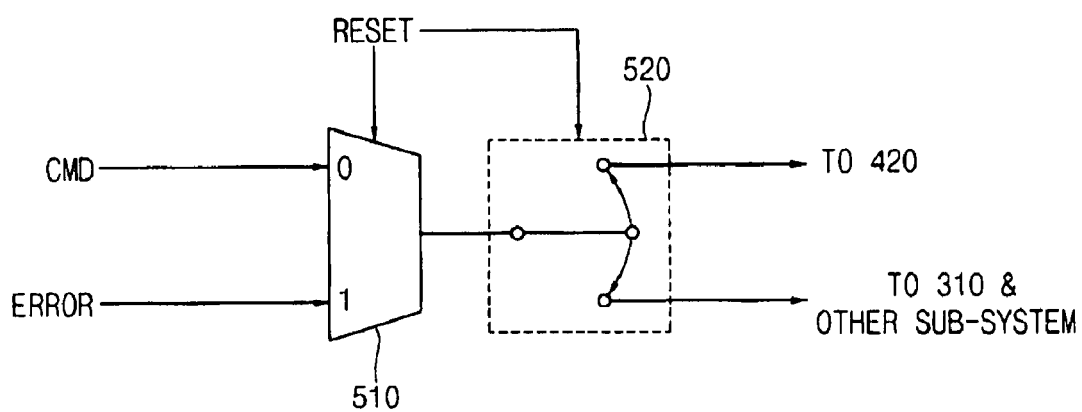
FIG. 5 is a block diagram illustrating an example of a command switching circuit according to an example embodiment.

FIG. 5 is a block diagram illustrating a command switching circuit according to an example embodiment. The example embodiment shown in FIG. 5 may be used as the command switching circuit shown in FIG. 4.

Referring to FIG. 5, the command switching circuit 410 may include a multiplexer 510 and a switch 520. The multiplexer 510 may select one of the command CMD and an error signal ERROR based on the reset mode signal RESET. For example, the multiplexer 510 may select the command CMD while the reset mode signal RESET is at a first logic level and may select the error signal ERROR while the reset mode signal RESET is at a second logic level.

The switch 520 may transmit a signal selected by the multiplexer 510 to the host processor 310 or the command processing unit 420 based on the reset mode signal RESET. For example, the switch 520 may transmit the signal to the command processing unit 420 when the reset mode signal RESET corresponds to a first logic level, and may transmit the signal to the host processor 310 when the reset mode signal RESET corresponds to a second logic level.

The command switching circuit 410 may transmit the command signal CMD selected from the multiplexer 510 to the command processing circuit 420 when the reset mode signal RESET corresponds to a first logic level.

The command switching circuit 410 may transmit the error signal ERROR selected from the multiplexer 510 to the host processor 310 when the reset mode signal RESET corresponds to a second logic level. Therefore, the command switching circuit 410 may transmit the error signal indicative of an abnormal operation mode while in an abnormal operation mode so that the command processing system 300 may suppress and/or prevent an error due to no response to a command when the command is received from an external source (e.g., the host processor 310 or other sub-systems), and may transmit the command to the command processing circuit 420 while in a normal operation mode.

Figure 6:
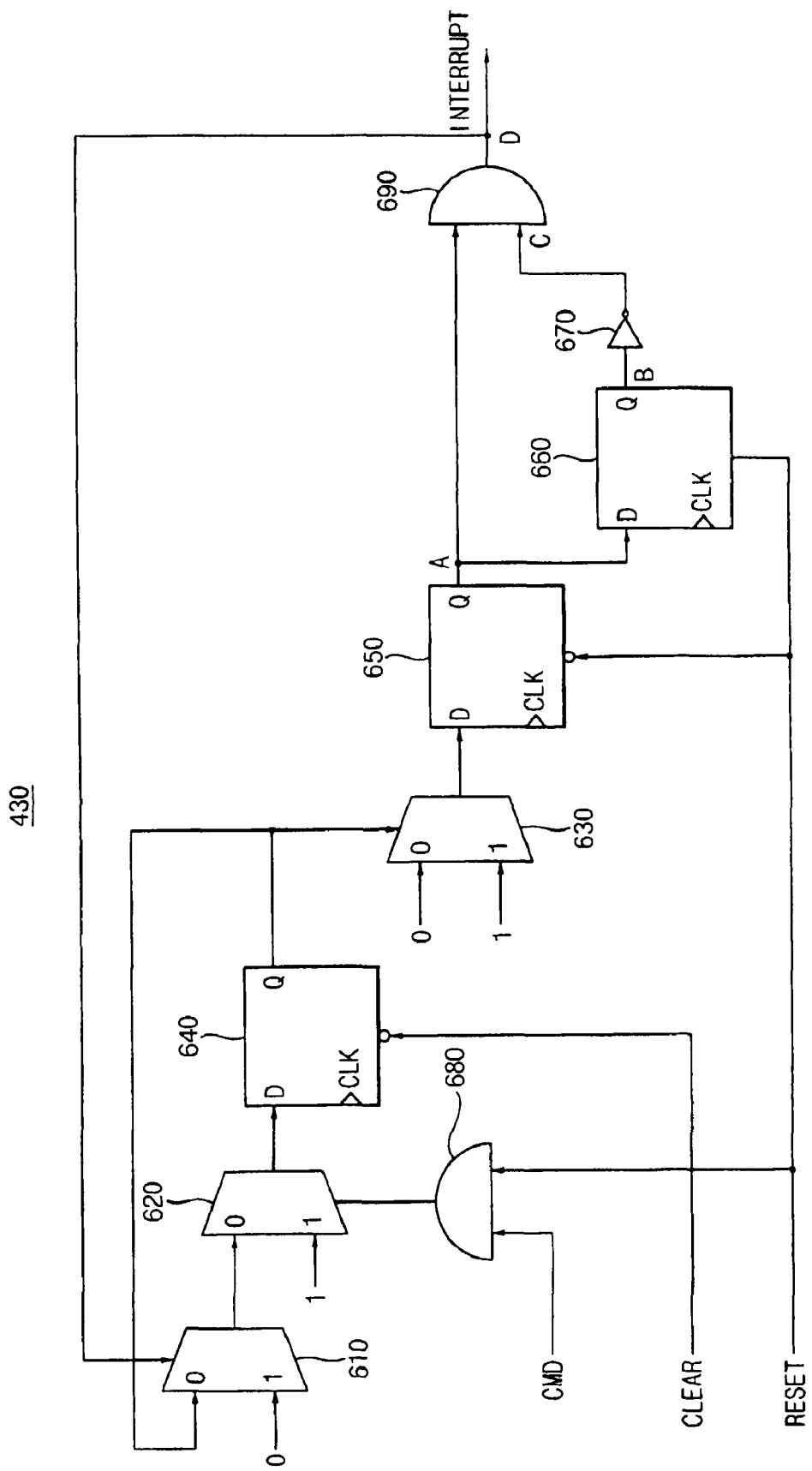
FIG. 6 is a block diagram illustrating an example of a interrupt signal generating circuit according to an example embodiment.

FIG. 6 is a block diagram illustrating an interrupt signal generating unit according to an example embodiment. The example embodiment shown in FIG. 6 may be used as the interrupt signal generating unit shown in FIG. 4.

Referring to FIG. 6, the interrupt signal generating circuit 430 may include a plurality of multiplexers, a plurality of registers, an inverter and a plurality of logic gates. For example, the interrupt signal generating circuit 430 may include first through third multiplexers 610, 620 and 630, first through third registers 640, 650 and 660, an inverter 670, and first and second logic (e.g., AND) gates 680 and 690.

The first multiplexer 610 may select one of a value stored in the first register 640 and a first logic value (e.g., 0) based on an interrupt signal. The first AND gate 680 may output a high logic signal when the sub-system 330 receives a command in an abnormal state, and otherwise may output a low logic signal.

The second multiplexer 620 may select one of a second logic value (e.g., 1) and the selected value from the first multiplexer 610 based on a value output from, the first AND gate 680 when the command is received. For example, the second multiplexer 620 may select the second logic value (e.g., 1) when the sub-system 330 receives a command in an abnormal state, and otherwise may select the selected value from the first multiplexer 610.

The first register 640 may receive an initialization signal CLEAR to be initialized when the sub-system 330 is initialized, and store a high logic value when the sub-system 330 receives a command in an abnormal state.

The third multiplexer 630 may select one of a high logic value and a low logic value based on a value stored in the first register 640. For example, the third multiplexer 630 may select a high logic value when the command is received in an abnormal state, and otherwise may select a low logic value.

The second register 650 may store a value output from the third multiplexer 630 when the sub-system 330 is in a normal state, and otherwise may be initialized. The second register 650 may be initialized when the command is received in an abnormal state and may store a value output from the third multiplexer 630 when the command is received in a normal state.

The third register 660 may store a value output from the second register 650 and output a value equal or substantially equal to a value stored in the second register 650 after delaying for at least one clock. For example, the third register 660 may generate a delayed value by delaying the value output from the second register 650 by at least one (e.g., a single) clock.

The inverter 670 may invert a value output from the third register 660. The second AND gate 690 may perform a logical AND operation on a value output from the second register 650 and a value output from the inverter 670, and may output the results.

Figure 7:
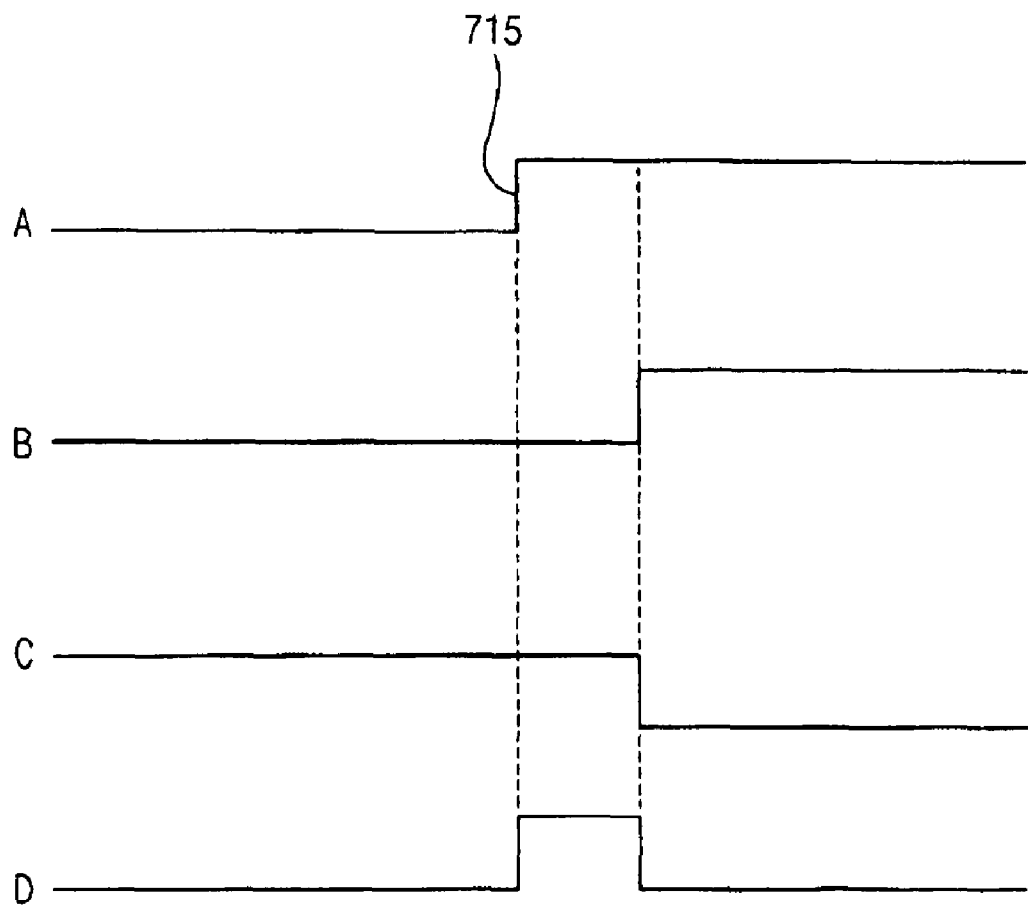
FIG. 7 is a timing diagram for illustrating an example process in which an interrupt signal may be generated.

FIG. 7 is a timing diagram for illustrating an example process for generating an interrupt signal. Referring to FIG. 7, reference numeral A represents an output of the second register 650 when the interrupt signal generating circuit 430 receives the command in an abnormal state and a state of the interrupt signal generating circuit 430 changes to a normal state. Reference numeral B represents an output of the third register 660. For example, reference numeral B represents a signal generated by delaying the output of the second register (e.g., reference numeral A) by a single clock.

Reference numeral C represents an output of the inverter 670. For example, reference numeral C represents a signal generated by inverting the output of the third register 660 (e.g., reference numeral B).

Reference numeral D represents an output of the second AND gate 690. For example, reference numeral D represents an operation result based on a logical AND operation between the output of the third register 660 and the output of the inverter 670. Reference numeral D represents the interrupt signal.

Still referring to FIG. 6, the interrupt signal generating circuit 430 may store the flag signal indicative of receiving the command into the first register 640 when the command is received from an external source in an abnormal state, and may generate the interrupt signal based on the flag signal when a state of the sub-system 330 is changed from an abnormal state to a normal state. The interrupt signal generating circuit 430 may initialize the flag signal stored in the first register 640 after transmitting the interrupt signal.

For example, the interrupt signal generating circuit 430 may store the flag signal when the command is received and the reset mode signal RESET corresponds to a first logic level, and may generate the interrupt signal based on the flag signal when the reset mode signal RESET changes from a first logic level to a second logic level. The interrupt signal generating circuit 430 may provide the interrupt signal as the selection signal for the first multiplexer 610 after transmitting the interrupt signal to initialize the flag signal stored in the first register 640.

As described above, example embodiments may be used to design a more robust system that more adequately processes a received command in an abnormal state.

Example embodiments may process tasks in accordance with an interrupt signal when a state of a command processing device changes from an abnormal state to a normal state.

Although, in some cases, example embodiments have been described with regard to particular logic signals (e.g., high or low logic values), it will be understood that these values may be used interchangeably, and example embodiments should not be limited to the particular configuration described herein.

While example embodiments have been described in detail, it should be understood that various changes, substitutions and alterations may be made herein without departing from the scope of the present invention.

What is claimed is:

1. A client device comprising:
    a command processing device configured to transmit an error signal while in an abnormal operation mode to prevent an error due to no response to a command received from an external source, the error signal being indicative of the abnormal operation mode, the command processing device being further configured to process the command while in a normal operation mode; and
    an interrupt signal generating circuit configured to store a flag signal when the command is received in the abnormal operation mode, configured to generate an interrupt signal based on the flag signal when the abnormal operation mode is changed to the normal operation mode.

2. The client device of claim 1, wherein the command processing device includes,
    a command processing circuit configured to process the command in the normal operation mode, and
    a command switching circuit configured to transmit the error signal while in an abnormal operation mode to prevent the error due to no response to the command received from the external source.

3. The client device of claim 2, wherein the abnormal operation mode and the normal operation mode are determined based on a signal received from the external source.

4. The client device of claim 2, wherein the command switching circuit includes,
    a multiplexer configured to select the error signal when the command is received in the abnormal operation mode and the command when the command is received in the normal operation mode, and
    a switch configured to transmit the selected error signal to the external source in the abnormal operation mode and the selected received command to the command processing circuit in the normal operation mode.

5. The client device of claim 1, wherein the interrupt signal generating circuit initializes the flag signal after transmitting the interrupt signal.

6. The client device of claim 1, wherein the interrupt signal generating circuit includes,
    a first register configured to store the flag signal when the command is received in the abnormal operation mode,
    a second register configured to receive the stored flag signal when the abnormal operation mode is changed to the normal operation mode and configured to output the received flag signal, and
    a third register configured to delay the output flag signal to generate a delayed flag signal, wherein
    the interrupt signal generating circuit performs a logical AND operation on the flag signal output from the second register and an inverted flag signal to generate the interrupt signal, the inverted flag signal being generated by inverting the delayed flag signal, and the interrupt signal generating circuit initializing the first register based on the interrupt signal.

7. A command processing system comprising:
    a server configured to transmit a reset mode signal; and
    the client device of claim 1, wherein the abnormal operation mode is a reset mode, and the command processing device is further configured to transmit the error signal while the transmitted reset mode signal is maintained at a first logic level to prevent the error when the command is received from the external source, and configured to process the command while the transmitted reset mode signal is maintained at a second logic level.

8. The command processing system of claim 7, wherein the command processing device includes,
    a command processing circuit configured to process the command in the normal operation mode, and
    a command switching circuit configured to transmit the error signal while in the abnormal operation mode to prevent the error due to no response to the command when the command is received from the external source.

9. The command processing system of claim 8, wherein the command switching circuit includes,
    a multiplexer configured to select the error signal when the command is received in the abnormal operation mode and the command when the command is received in the normal operation mode, and
    a switch configured to transmit the selected error signal to the external source in the abnormal operation mode and the selected received command to the command processing circuit in the normal operation mode.

10. The command processing system of claim 7, wherein the interrupt signal generating circuit initializes the flag signal after transmitting the interrupt signal.

11. The command processing system of claim 7, wherein the interrupt signal generating circuit includes,
    a first register configured to store the flag signal when the command is received in the abnormal operation mode,
    a second register configured to receive the stored flag signal when the abnormal operation mode is changed to the normal operation mode and configured to output the received flag signal, and
    a third register configured to delay the output flag signal to generate a delayed flag signal, wherein
    the interrupt signal generating circuit performs a logical AND operation on the flag signal output from the second register and an inverted flag signal to generate the interrupt signal, the inverted flag signal being generated by inverting the delayed flag signal, and the interrupt signal generating circuit initializing the first register based on the interrupt signal.

12. A method of processing a command, comprising:
    preventing an error due to no response to a command when the command is received from an external source by transmitting an error signal while maintaining an abnormal operation mode, the error signal being indicative of an abnormal operation mode;
    storing a flag signal when the command is received in the abnormal operation mode; and
    generating an interrupt signal based on the flag signal when the abnormal operation mode changes to the normal operation mode.

13. The method of claim 12, further including,
  transmitting the command to a command processing circuit while maintaining a normal operation mode.

14. The method of claim 12, further including,
  initializing the flag signal after transmitting the interrupt signal.

15. The method of claim 12, wherein the abnormal operation mode is a reset mode, the reset mode being maintained while a reset mode signal is at a first logic level, the method further including,
  transmitting a reset mode signal,
  transmitting the error signal while the transmitted reset mode signal is maintained at a first logic level, the error signal being indicative of a reset mode, and
  processing the command while the transmitted reset mode signal is maintained at a second logic level.

16. The method of claim 15, further including,
  storing the flag signal when the command is received at the first logic level of the reset mode signal, and
  generating an interrupt signal based on the flag signal when the reset mode signal transitions from the first logic level to the second logic level.

17. The method of claim 16, further including,
  initializing the flag signal after transmitting the interrupt signal.

* * * * *